(12) United States Patent
Kim

(10) Patent No.: US 8,610,812 B2
(45) Date of Patent: Dec. 17, 2013

(54) DIGITAL PHOTOGRAPHING APPARATUS AND CONTROL METHOD THEREOF

(75) Inventor: Eun-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 13/240,306

(22) Filed: Sep. 22, 2011

(65) Prior Publication Data

US 2012/0113281 A1      May 10, 2012

(30) Foreign Application Priority Data

Nov. 4, 2010  (KR) .................. 10-2010-0190253

(51) Int. Cl.
*H04N 5/222*      (2006.01)
*H04N 7/14*       (2006.01)

(52) U.S. Cl.
USPC .................................. 348/333.12; 348/14.01

(58) Field of Classification Search
USPC ................................................ 348/333, 14.01
See application file for complete search history.

(56) References Cited

U.S. PATENT DOCUMENTS

| | | | | |
|---|---|---|---|---|
| 2005/0179785 A1* | 8/2005 | Shingu et al. | ............... | 348/211.3 |
| 2006/0092291 A1* | 5/2006 | Bodie | ...................... | 348/231.99 |
| 2008/0033983 A1* | 2/2008 | Ko | .................................. | 707/102 |
| 2008/0077844 A1* | 3/2008 | Kim et al. | ...................... | 715/201 |
| 2009/0060235 A1* | 3/2009 | Woo et al. | ...................... | 381/303 |
| 2009/0122157 A1* | 5/2009 | Kuboyama et al. | ........ | 348/231.4 |
| 2009/0216539 A1* | 8/2009 | Chiang | .......................... | 704/275 |
| 2010/0085415 A1* | 4/2010 | Rahman | ..................... | 348/14.08 |
| 2011/0115940 A1* | 5/2011 | Ojima et al. | ............... | 348/222.1 |
| 2011/0122275 A1* | 5/2011 | Kawai et al. | ............... | 348/222.1 |
| 2011/0157420 A1* | 6/2011 | Bos et al. | .................... | 348/231.2 |
| 2011/0205379 A1* | 8/2011 | Konicek | ...................... | 348/211.1 |
| 2012/0075407 A1* | 3/2012 | Wessling | .................... | 348/14.08 |

FOREIGN PATENT DOCUMENTS

| | | | |
|---|---|---|---|
| JP | 2003-216175 A | 7/2003 |
| JP | 2008-160755 A | 7/2008 |

* cited by examiner

Primary Examiner — James M Hannett
Assistant Examiner — Padma Haliyur
(74) Attorney, Agent, or Firm — Drinker Biddle & Reath LLP

(57) ABSTRACT

A digital photographing apparatus and a control method thereof are disclosed. The digital photographing apparatus receives a voice, recognizes the received voice, and stores the recognized voice to correspond to a face. In this way, by recognizing the voice while displaying an image, an owner of the voice can be identified and thus a face of a person which is not included in an image being captured can be displayed on a screen.

17 Claims, 4 Drawing Sheets

DIGITAL PHOTOGRAPHING APPARATUS AND CONTROL METHOD THEREOF

CROSS-REFERENCE TO RELATED PATENT APPLICATION

This application claims the benefit of Korean Patent Application No. 10-2010-0109253, filed on Nov. 4, 2010, in the Korean Intellectual Property Office, the entire disclosure of which is incorporated herein by reference.

BACKGROUND

1. Field of the Invention

The invention relates to a digital photographing apparatus and a control method thereof.

2. Description of the Related Art

Digital cameras are configured such that only an image of a screen is captured, and thus persons outside the screen cannot be known from a captured image or moving image. However, particularly in moving images, or movies, voices of a photographer and persons around the photographer can be heard, but their identity may not be known.

SUMMARY

Therefore, there is a need in the art for a method and a digital photographing apparatus, the digital photographing apparatus including a digital signal processor (DSP) which receives a voice, recognizes the received voice, and stores the recognized voice to correspond to a face.

The DSP may display the face corresponding to the recognized voice while displaying an input image on a display screen of the digital photographing apparatus.

The DSP, upon receiving the voice, may display an identifier corresponding to the voice on a display screen of the digital photographing apparatus.

The DSP may store information about the recognized voice and information about the face corresponding to the recognized voice in an exchangeable image file format (EXIF) generated by capturing an input image.

The DSP may display the face corresponding to the recognized voice such that the face blinks according to an input timing of the voice on a display screen of the digital photographing apparatus.

The DSP may determine a sound source direction of the voice and display the face corresponding to the recognized voice at a position of a display screen of the digital photographing apparatus according to the determined sound source direction.

The DSP, if detecting a plurality of faces from an input image, may determine whether the face corresponding to the recognized voice is included in the plurality of detected faces, and if the face corresponding to the recognized voice is not included in the plurality of detected faces, the DSP may display the face corresponding to the recognized voice together with the input image.

The digital photographing apparatus may further include a microphone receiving the voice, in which the DSP may include a face detecting unit detecting a face from an input image, a face recognizing unit recognizing the detected face, a voice recognizing unit recognizing the voice received through the microphone, and a control unit storing the recognized voice to correspond to the recognized face, displaying the input image on a display screen of the digital photographing apparatus, and displaying the face corresponding to the recognized voice on the display screen if the face corresponding to the recognized voice is not detected from the input image.

The DSP may further include a direction determining unit determining a sound source direction of the voice, and the control unit displays the face corresponding to the recognized voice at a position of the display screen according to the sound source direction on the display screen.

The input image may include a live-view image or a playback image.

The input image may include a still image or a moving image.

According to another aspect of the invention, there is provided a digital photographing apparatus including a voice recognizing unit recognizing voice, a storing unit storing voice and a face to match the voice and the face, and a control unit comparing the recognized voice with stored voice, and extracting a face matched to the recognized voice from the storing unit and displaying the extracted face if the recognized voice is identical to the stored voice.

The control unit may display an input image on a display screen and display the face matched to the recognized voice at a particular position of the display screen.

The input image may include a live-view image or a playback image.

The input image may include a still image or a moving image.

According to another aspect of the invention, there is provided a control method of a digital photographing apparatus. The control method includes receiving voice, recognizing the received voice, and storing the recognized voice to correspond to a face.

The control method may further include displaying an input image on a display screen and displaying the face corresponding to the recognized voice on the display screen.

The control method may further include displaying the face corresponding to the recognized voice such that the face blinks according to an input timing of the voice on the display screen.

The control method may further include determining a sound source direction of the voice and displaying the face corresponding to the recognized voice at a position of the display screen according to the determined sound source direction.

The storing of the recognized voice may include capturing the input image, generating an exchangeable image file format (EXIF), and storing information about the recognized voice and information about the face corresponding to the recognized voice in the generated EXIF.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
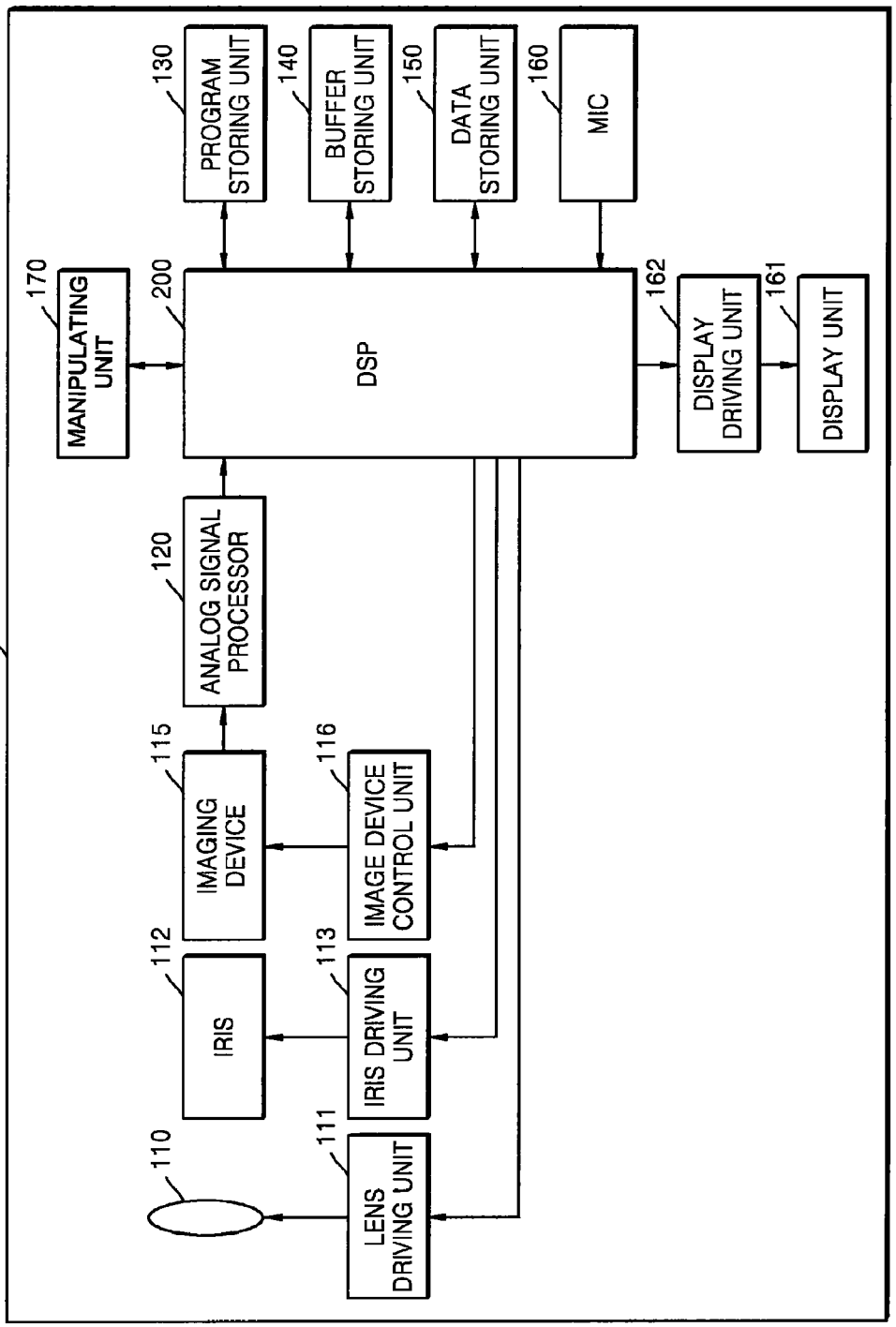
FIG. 1 is a schematic block diagram of a digital camera as an example of a digital photographing apparatus according to an embodiment of the invention.

The invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, the thicknesses of layers and regions are exaggerated for clarity. Like reference numerals in the drawings denote like elements, and thus their repetitive description will be omitted.

FIG. 1 is a schematic block diagram of a digital camera 100 as an example of a digital photographing apparatus according to an embodiment of the invention.

As an example of the digital photographing apparatus according to an embodiment of the invention, the digital camera 100 is described. However, the digital photographing apparatus is not limited to the digital camera 100 shown in FIG. 1. For example, a digital apparatus may be a camera phone, a Personal Digital Assistant (PDA), a Portable Multimedia Player (PMP), or the like.

The digital camera 100 according to the current embodiment of the invention may include a lens unit 110, a lens driving unit 111, an iris 112, an iris driving unit 113, an imaging device 115, an imaging device control unit 116, an analog signal processor 120, a program storing unit 130, a buffer storing unit 140, a data storing unit 150, a mic 160, a display driving unit 162, a display unit 161, a digital signal processor (DSP) 200, and a manipulating unit 170. Herein, the lens unit 110, the lens driving unit 111, the iris 112, the iris driving unit 113, the imaging device 115, the imaging device control unit 116, and the analog signal processor 120 may be collectively referred to as a photographing unit.

The lens unit 110 collects a light signal. The lens unit 110 includes a zoom lens for reducing or increasing the angle of view according to a focal length and a focus lens for adjusting the focus on an object, and each of the zoom lens and the focus lens may be a single lens or a group of a plurality of lenses.

The iris 112 regulates the light intensity of an incident light by controlling the amount of opening/closing thereof.

The lens driving unit 111 and the iris driving unit 113 are provided with a control signal from the DSP 200 to respectively drive the lens unit 110 and the iris 112. The lens driving unit 111 controls the position of a lens to adjust a focal length, and performs auto focusing, zooming, focusing operations, and so forth. The iris driving unit 113 controls the amount of opening/closing of the iris 112, and in particular, adjusts an f-number or an iris value to perform auto focusing, auto exposure correction, focusing, depth-of-field (DOF) adjusting operations, and the like. The light signal passing through the lens unit 110 forms an image of an object on a light-receiving surface of the imaging device 115. The imaging device 115 may be a charge-coupled device (CCD), a complementary metal-oxide semiconductor image sensor (CIS), or a high-speed image sensor which converts the light signal into an electric signal. The sensitivity of the imaging device 115 may be controlled by the imaging device control unit 116. The imaging device control unit 116 may control the imaging device 115 according to a control signal, which is automatically generated by an image signal input in real time or manually input by the user's manipulation.

The exposure time of the imaging device 115 is controlled by a shutter (not shown). The shutter may be a mechanical shutter for adjusting incidence of light by moving a shade or an electronic shutter for controlling exposure by supplying an electric signal to the electronic shutter.

The analog signal processor 120 performs noise reduction processing, gain control, waveform standardization, analog-digital conversion, and the like with respect to the analog signal provided from the imaging device 115.

Through the manipulating unit 170, a control signal can be externally input, for example, from a user. The manipulating unit 170 includes a shutter-release button for inputting a shutter-release signal which exposes the imaging device 115 to light for a predetermined time to photograph an object, a power button for inputting a control signal for controlling power-on/off, a wide-angle zoom button and a telephoto zoom button for increasing and reducing the angle of view, respectively, and other function buttons for mode selection from a text input mode, a photographing mode, a play mode, and the like, a white balance setting function, an exposure setting function, and so forth. The manipulating unit 170 may be implemented with, without being limited to, various buttons as described above, but may also be implemented in any form of user input, such as a keyboard, a touch pad, a touch screen, a remote control, or the like.

The digital camera 100 may include the program storing unit 130 for storing programs of an operating system and an application system of the digital camera 100, the buffer storing unit 140 for temporarily storing data required during an operation or storing result data, and the data storing unit 150 for storing data required for programs, such as an image file corresponding to an image signal.

The digital camera 100 also includes the display unit 161 for displaying an operational state of the digital camera 100 or image information obtained by the digital camera 100. The display unit 161 may provide visual information and/or audible information to the user. To provide information, the display unit 161 may include, for example, a liquid crystal display (LCD) or an organic light emitting diode (OLED) display. The display driving unit 162 provides a drive signal to the display unit 160.

The mic 160 receives a voice, converts the voice into an electric signal, and outputs the electric signal to the DSP 200. The mic 160 converts the received voice or sound wave into voice data or a voice electric signal having a waveform. Herein, the mic 160 is not limited by a type thereof.

The digital camera 100 also includes the DSP 200 for processing an input image signal and controlling components of the digital camera 100 according to the input image signal or an externally input signal. The DSP 200 may perform image signal processing for quality improvement, such as noise reduction, gamma correction, color filter array interpolation, color matrix, color correction, and color enhancement, with respect to input image data. The DSP 200 also may compress the image data generated by performing image signal processing for quality improvement to generate an image file, or may restore the image data from the image file. An image compression format may be a reversible format or an irreversible format. For example, a suitable format may be a Joint Photographic Experts Group (JPEG) format or a JPEG-2000 format. The compressed data may be stored in the data storing unit 150. The DSP 200 may also functionally perform indistinctness processing, color processing, blur processing, edge emphasis processing, image interpretation processing, image recognition processing, image effect processing, and the like. The image recognition processing may include face recognition and scene recognition. For example, luminance level adjustment, color correction, contrast adjustment, contour emphasis adjustment, screen dividing processing, image generation and synthesis processing, and the like may be performed.

The DSP 200 may execute a program stored in the program storing unit 130 or include a separate module to generate a control signal for controlling auto focusing, zooming, focus changing, and auto exposure correction operations, provide the control signal to the lens driving unit 111, the iris driving unit 113, and the imaging device control unit 116, and collectively control operations of components included in the digital camera 100, such as a shutter, a flash, and the like.

Figure 2:
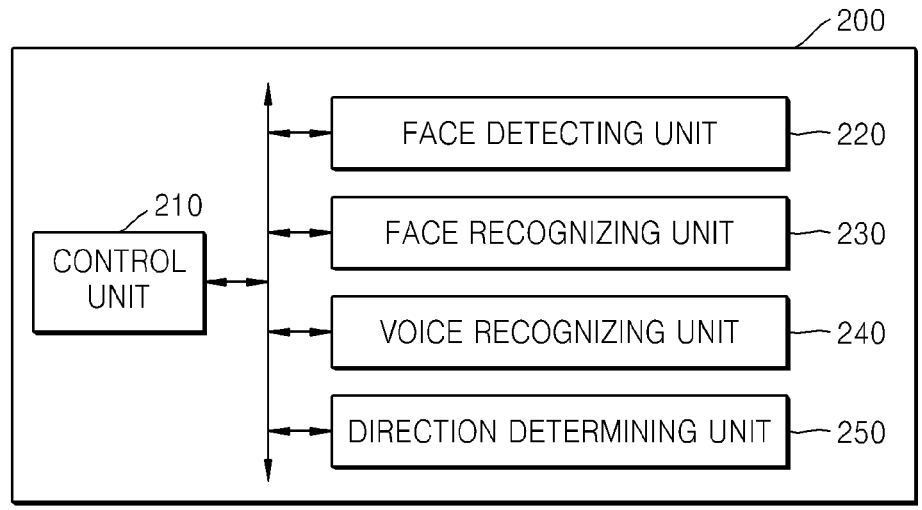
FIG. 2 is a detailed block diagram of a digital signal processor included in FIG. 1.

FIG. 2 is a detailed block diagram of the DSP 200 shown in FIG. 1.

Referring to FIG. 2, the DSP 200 includes a control unit 210, a face detecting unit 220, a face recognizing unit 230, a voice recognizing unit 240, and a direction determining unit 250. The DSP 200 receives a voice through the mic 160, recognizes the received voice, and stores the recognized voice to correspond to a face. That is, the DSP 200 recognizes the received voice to determine an owner of the recognized voice and stores the recognized voice and a face of the owner to correspond to each other. Thus, in the data storing unit 150 shown in FIG. 1 or another storage means, information about a face of a particular person and information about a voice of the person are stored together. Herein, the voice and the face may be stored prior to capturing of a still image or a moving image. Moreover, a corresponding face may be selected during playback and a voice may be input to store the face and the voice. Face information corresponding to voice input during capturing may also be stored in an exchangeable image file format (EXIF) of a captured image.

The control unit 210 controls an operation of the DSP 200.

Figure 3A:
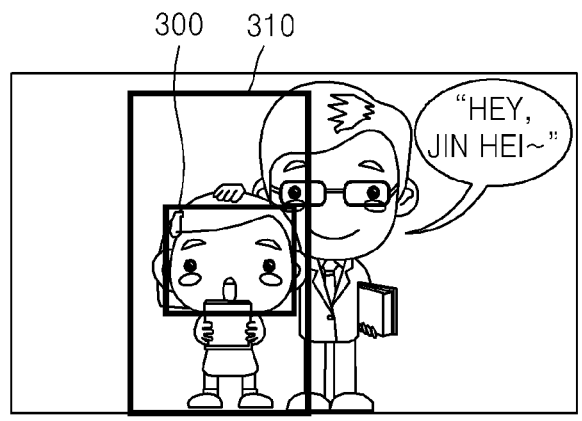
FIGS. 3A and 3B are diagrams for describing display of a face after voice recognition according to another embodiment of the invention.
Figure 3B:

The control unit 210 displays an input image on the display unit 161 shown in FIG. 1 and also displays a face corresponding to the recognized voice on the display unit 161. Herein, the input image may be a still image or a moving image, or a live-view image or a playback image. FIGS. 3A and 3B are diagrams for describing the display of a face after voice recognition according to another embodiment of the invention. Referring to FIG. 3A, two persons are in a screen, but only the left-side person is completely included in a photographing screen 310. The right-side person talks to the left-side person and says, "Hey, Jin Hei". Upon input of a voice of the right-side person through the mic 160 of the digital camera 100, a face of the right-side person is displayed on a right upper portion 320 of the photographing screen 310 as shown in FIG. 3B. The control unit 210 may determine a sound source direction of the voice and display the face at a corresponding position of the screen 310 according to the sound source direction. For example, according to the sound source direction of the input voice, the control unit 210 may display the face in the right upper portion 320 or a left upper portion of the screen 310. The control unit 210 may display a face only for the time corresponding to an input time of the voice. For example, the corresponding face is displayed upon input of the voice, and the corresponding face is not displayed if the voice is not heard, and this process may be repeated. This may be on a live-view image or may be for moving images.

Upon input of the voice, the control unit 210 may display an identifier corresponding to the voice on the display unit 161. Herein, the identifier may be a voice icon indicating that the voice is being currently input.

The face detecting unit 220 detects a face from the input image. Herein, the input image may include a playback image or a live-view image. The face detecting unit 220 compares previously stored feature data of the face with input image data to determine whether the input image includes feature data of the face and if so, determines a position at which the feature data of the face exists. There are many conventional techniques related to face detection, and thus the face may be detected by using an Adaboost algorithm and skin color information, for example.

The face recognizing unit 230 recognizes the detected face. The face recognizing unit 230 recognizes the face by comparing the face detected by the face detecting unit 220 with previously stored face data.

The voice recognizing unit 230 recognizes voice input through the mic 160. Voice recognition includes extracting a feature vector from a voice sample corresponding to a user's utterance and compares the extracted feature vector with a feature vector of the previously stored voice to determine whether owners of the input voice and the previously stored voice are identical to each other. Herein, voice recognition may use various conventional voice recognition techniques.

The direction determining unit 250 determines a sound source direction of the input voice. Herein, the sound source direction may be determined from a time difference in input to two microphones and may also be determined by using other conventional techniques.

If the face corresponding to the recognized voice is not detected from the input image, the control unit 210 displays the face corresponding to the recognized voice on the display unit 161. The control unit 210 searches in previously stored voices for the same voice as the currently input voice, and searches for a face matched to the found voice and displays the found face on the display unit 161.

Thus, when a voice of a person not shown in a screen which is captured or is being currently captured is heard, the owner of the voice can be displayed and a face of the person can be displayed at a position directed toward the source of the voice, that is, the person.

Figure 4:
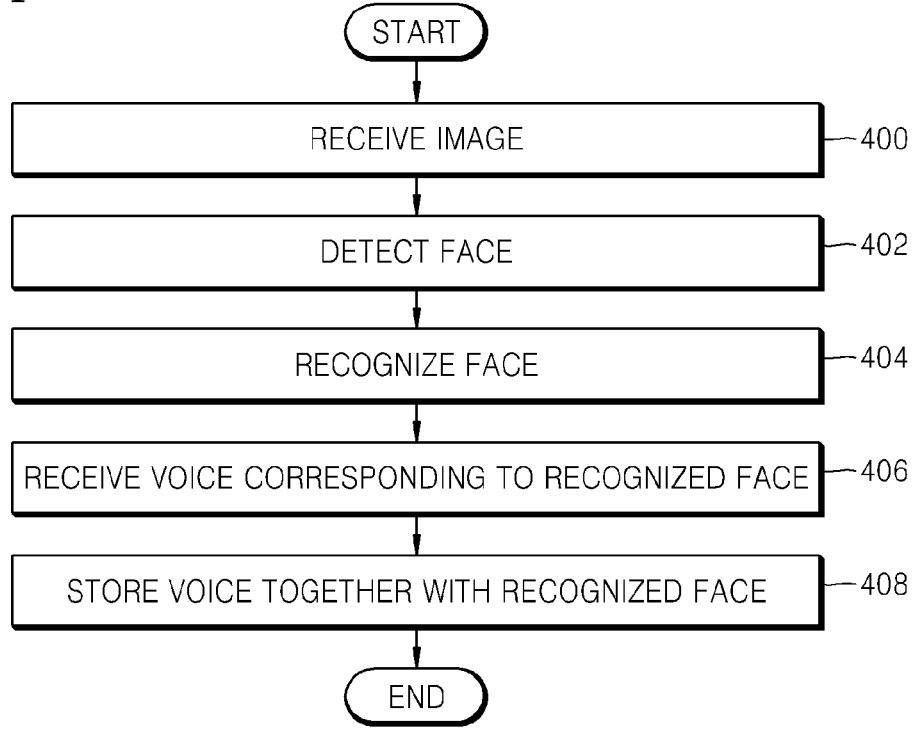
FIG. 4 is a flowchart illustrating a control method of a digital photographing apparatus, according to an embodiment of the invention.

FIG. 4 is a flowchart illustrating a control method of a digital photographing apparatus, according to an embodiment of the invention.

Shown in FIG. 4 is a control method of a digital photographing apparatus for storing a face together with a voice.

An image is input in operation 400, and a face is detected from the input image in operation 402. Herein, the image may be a still image or a moving image, or a live-view image or a playback image.

A face is recognized in operation 404, and a voice corresponding to the recognized face is input in operation 406. Face detection, recognition, and voice input may be performed at the same time.

In operation 408, the voice is stored associated with the recognized face.

Figure 5:
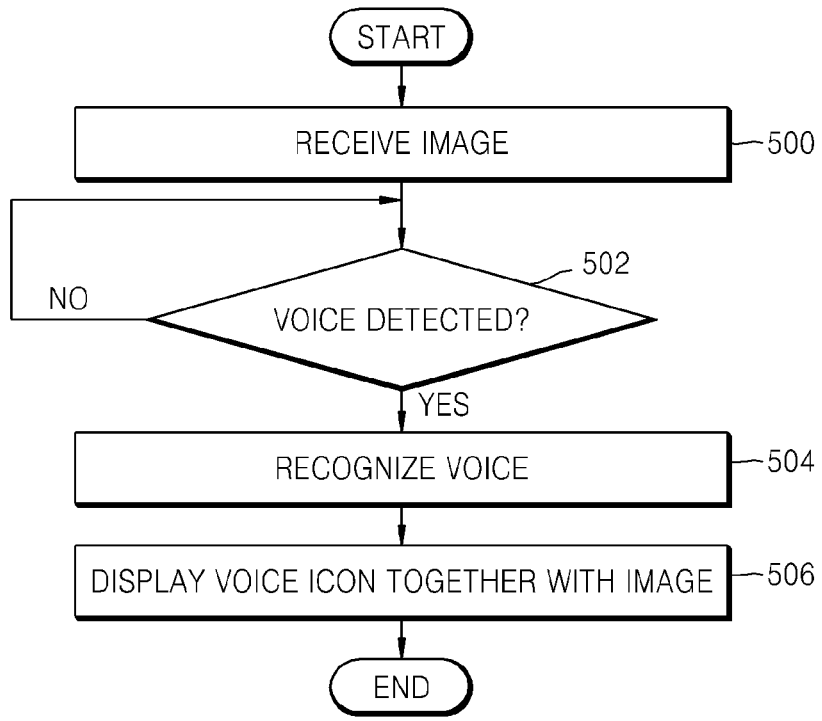
FIG. 5 is a flowchart illustrating a control method of a digital photographing apparatus, according to another embodiment of the invention.

FIG. 5 is a flowchart illustrating a control method of a digital photographing apparatus, according to another embodiment of the invention.

Shown in FIG. 5 is a control method of a digital photographing apparatus for displaying a voice being input during display of an input image. In operation 500, an image is input. Herein, the image may include a live-view image or a playback image. A voice is detected in operation 502, and then the voice is recognized in operation 504. In operation 506, a voice icon is displayed together with the input image. Herein, a voice recognition process may be omitted. The voice is recognized and a face stored by being matched to the recognized voice may be displayed together with the input image.

Figure 6:
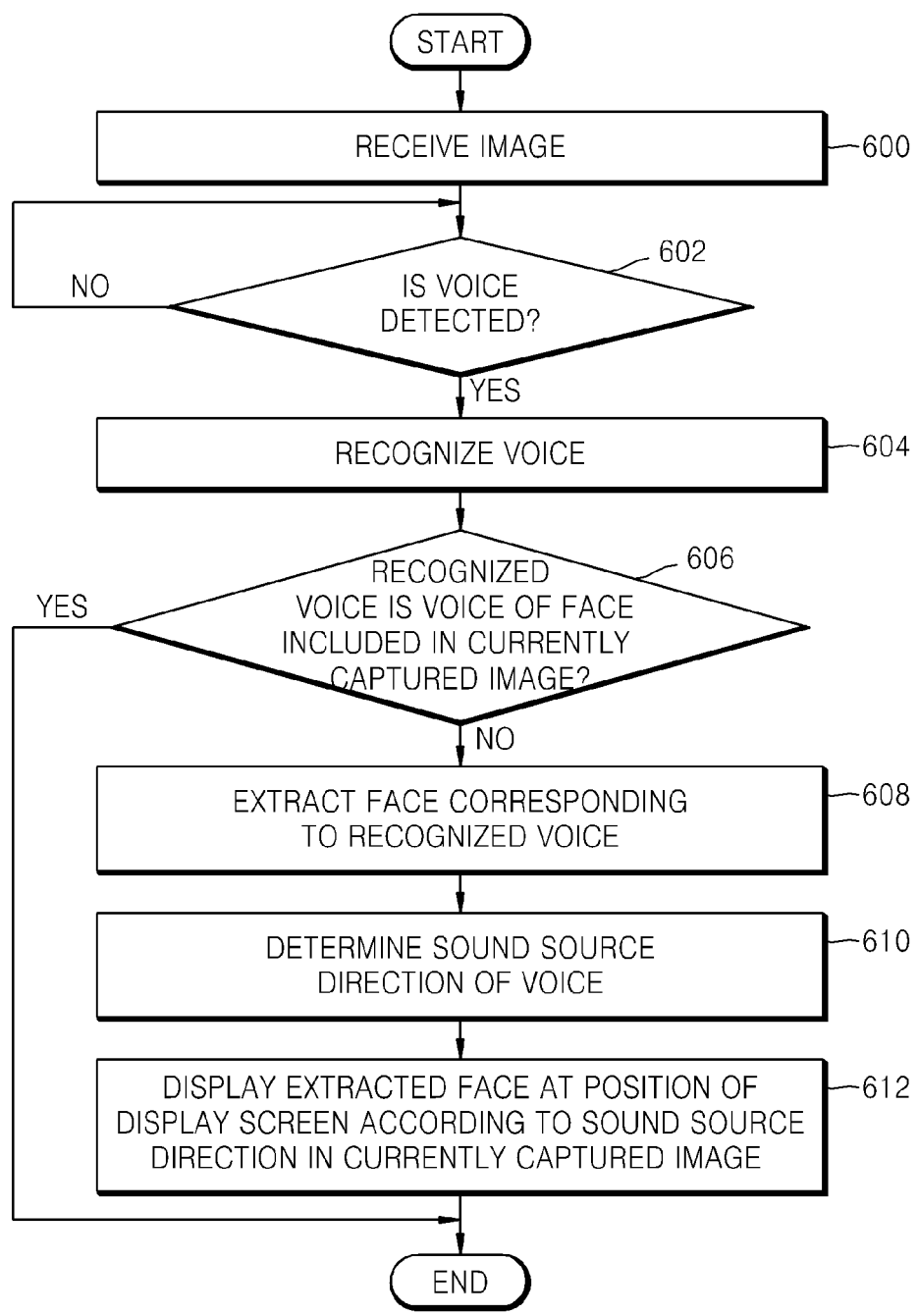
FIG. 6 is flowchart illustrating a control method of a digital photographing apparatus, according to another embodiment of the invention.

FIG. 6 is flowchart illustrating a control method of a digital photographing apparatus, according to another embodiment of the invention.

Referring to FIG. 6, an image is input in operation 600. Herein, the image may be a still image or a moving image. If a voice is detected in operation 602, the voice is recognized in operation 604. In operation 606, it is determined whether the recognized voice is a voice of a face included in a currently captured image. Herein, the currently captured image may include a live-view image or a playback image. Face detection and face recognition are performed on the currently captured image to determine whether the recognized voice is a voice matched to the recognized face. If the recognized voice is not a voice of a face included in the currently captured image in operation 606, a face corresponding to the recognized voice is extracted from previously stored voices and faces in operation 608. In operation 610, a sound source direction of the recognized voice is determined. In operation 612, the extracted face is displayed at a position of a display screen according to the sound source direction in the currently captured image, for example, a right upper portion or a left upper portion of the display screen.

The digital photographing apparatus according to an embodiment of the invention can identify an owner of a voice through voice recognition, and thus display a face of the owner not shown in an image being captured on a screen.

In addition, the user can easily identify the persons who are with the user at the time of capturing, though not being shown on the screen. Moreover, it is possible to solve a problem that when a photographer of a moving image speaks or persons around the photographer speaks, only their voices can be heard, but the owners of those voices is not known.

Furthermore, in light of a photographer, the photographer can know an owner of a voice without turning from a main object, thereby satisfying a curiosity about surroundings while clearly showing an object during moving image or still image capturing.

The foregoing embodiments have been described in relation to voice storage and face display on the assumption of voice recognition, but faces that are not included in a photographing screen are recognized and the faces recognized in the photographing screen may be displayed on a captured image. When the captured image is edited, faces included in the edited portion may be displayed on the image.

The invention provides a photographing apparatus which identifies an owner of a particular voice through voice recognition and displays a face of the corresponding owner not shown in an image being captured on a screen.

Though terms like first and second are used to describe various elements, the elements are not limited to these terms. These terms are used only to differentiate an element from another element.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The digital photographing apparatus according to the invention may include a processor, a memory for storing and executing program data, a permanent storage such as a disk drive, a communication port for communicating with an external device, and a user interface unit, such as a touch panel, a key, or a button. Methods implemented with a software module or algorithm may be stored as computer-readable codes or program commands, which can be executed on the processor, on a computer-readable recording medium, etc. Examples of the computer-readable recording medium may include magnetic storage media such as read-only memory (ROM), random access memory (RAM), floppy disks, and hard disks, and optical data storage devices such as CD-ROMs and digital versatile discs (DVD). The computer-readable recording medium can also be distributed over a network of coupled computer systems so that the computer-readable code is stored and executed in a decentralized fashion. The code can be read by the computer, stored in the memory, and executed on the processor.

All documents cited in the invention, including published documents, patent applications, and patents, may be incorporated herein in their entirety by reference in the same manner as when each cited document is separately and specifically incorporated or incorporated in its entirety.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented with an algorithm executed in one or more processors. Furthermore, the invention could employ conventional techniques for electronics configuration, signal processing and/or control, data processing, and the like. Terms such as "mechanism", "element", "means", "component", etc., may be used in a broad sense, and are not limited to mechanical and physical components. The terms may include a meaning of a series of routines of software in connection with a processor or the like.

The particular implementations shown and described herein are illustrative examples of the invention and are not intended to otherwise limit the scope of the invention in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

In the specification (particularly in the claims) of the invention, the use of the term "the" and its similar indicative terms may correspond to both singular and plural. When a range is stated in the invention, it covers the invention where an individual value included in that range is applied (unless stated otherwise), and such statement is equivalent to statement of each individual value forming the range in the detailed description of the invention. Unless the order of steps forming the method according to the invention are explicitly stated or stated otherwise, those steps may be performed in any appropriate order. The stated order of the steps does not necessarily limit the invention. In the invention, the use of any example or exemplary term (for example, "and so forth") is merely intended to describe the invention in detail, and thus unless defined by the claims, the scope of the invention is not limited by the example or exemplary term. In addition, it can be understood by those of ordinary skill in the art that various modifications, combinations, and changes can be made according to design conditions and factors within the scope of claims and equivalents thereof.

What is claimed is:

1. A digital photographing apparatus comprising:
    a digital signal processor (DSP) configured to
        receive a voice,
        recognize the received voice as belonging to a particular subject,
        store the recognized voice to correspond to a face of the particular subject,
        determine a sound source direction of the voice, and
        display the face corresponding to the recognized voice at a position of a display screen of the digital photographing apparatus according to the determined sound source direction in a currently captured image.

2. The digital photographing apparatus of claim 1, wherein the DSP is configured to display the face corresponding to the recognized voice while displaying an input image on a display screen of the digital photographing apparatus.

3. The digital photographing apparatus of claim 1, wherein the DSP is configured to display an identifier corresponding to the voice on a display screen of the digital photographing apparatus, upon receiving the voice.

4. The digital photographing apparatus of claim 1, wherein the DSP is configured to store information about the recognized voice and information about the face corresponding to the recognized voice in an exchangeable image file format (EXIF) generated by capturing an input image.

5. The digital photographing apparatus of claim 1, wherein the DSP is configured to display the face corresponding to the recognized voice such that the face is displayed on a display according to an input time of the voice.

6. The digital photographing apparatus of claim 1, wherein the DSP is further configured to determine, whether the face corresponding to the recognized voice is included in a plurality of detected faces, if the plurality of faces are detected from an input image, and
    if the face corresponding to the recognized voice is not included in the plurality of detected faces, the DSP displays the face corresponding to the recognized voice together with the input image.

7. The digital photographing apparatus of claim 1, further comprising:
    a microphone for receiving the voice,
    wherein the DSP comprises:
        a face detecting unit configured to detect a face from an input image;
        a face recognizing unit configured to recognize the detected face;
        a voice recognizing unit configured to recognize the voice received through the microphone; and
        a control unit configured to store the recognized voice to correspond to the recognized face, display the input image on a display screen of the digital photographing apparatus, and display the face corresponding to the recognized voice on the display screen if the face corresponding to the recognized voice is not detected from the input image.

8. The digital photographing apparatus of claim 7, wherein the DSP further comprises a direction determining unit configured to determine a sound source direction of the voice, and wherein the control unit is configured to display the face corresponding to the recognized voice at a position of the display screen according to the sound source direction on the display screen.

9. The digital photographing apparatus of claim 2, wherein the input image comprises a live-view image or a playback image.

10. The digital photographing apparatus of claim 2, wherein the input image comprises a still image or a moving image.

11. A digital photographing apparatus comprising:
    a voice recognizing unit configured to recognize voice;
    a storing unit configured to store a voice and a face to match the voice and the face;
    a direction determining unit configured to determine a sound source direction of the voice; and
    a control unit configured to
        compare a recognized voice with a stored voice belonging to a particular subject,
        if the recognized voice is identical to the stored voice, extract a face of the particular subject matched to the recognized voice from the storing unit,
        display an input image on a display screen, and
        display the extracted face matched to the recognized voice at a position of the display screen according to a determined sound source direction of the recognized voice in the input image.

12. The digital photographing apparatus of claim 11, wherein the input image comprises a live-view image or a playback image.

13. The digital photographing apparatus of claim 11, wherein the input image comprises a still image or a moving image.

14. A control method of a digital photographing apparatus, the control method comprising:
    receiving a voice;
    recognizing the received voice as belonging to a particular subject;
    storing the recognized voice to correspond to a face of the particular subject;
    determining a sound source direction of the voice; and
    displaying the face corresponding to the recognized voice at a position of the display screen according to the determined sound source direction in a currently captured image.

15. The control method of claim 14, further comprising:
    displaying an input image on a display screen; and
    displaying the face corresponding to the recognized voice on the display screen.

16. The control method of claim 14, further comprising:
    displaying the face corresponding to the recognized voice such that the face is displayed according to an input time of the voice.

17. The control method of claim 14, wherein the storing of the recognized voice comprises:
   capturing the input image;
   generating an exchangeable image file format (EXIF); and
   storing information about the recognized voice and information about the face corresponding to the recognized voice in the generated EXIF.

\* \* \* \* \*

UNITED STATES PATENT AND TRADEMARK OFFICE
CERTIFICATE OF CORRECTION

Page 1 of 1

PATENT NO. : 8,610,812 B2
APPLICATION NO. : 13/240306
DATED : December 17, 2013
INVENTOR(S) : Eun-young Kim It is certified that error appears in the above-identified patent and that said Letters Patent is hereby corrected as shown below:

ON THE TITLE PAGE:

In (30) Foreign Application Priority Data, replace
"Nov. 4, 2010 (KR).......10-2010-0190253" with
--Nov. 4, 2010 (KR).......10-2010-0109253--

Signed and Sealed this
Seventh Day of October, 2014

Michelle K. Lee
*Deputy Director of the United States Patent and Trademark Office*